(12) United States Patent
Iesaki (10) Patent No.: US 8,587,236 B2
(45) Date of Patent: Nov. 19, 2013

(54) MOTOR CONTROL DEVICE

(75) Inventor: Kenichi Iesaki, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 126 days.

(21) Appl. No.: 13/238,216

(22) Filed: Sep. 21, 2011

(65) Prior Publication Data
US 2012/0081062 A1   Apr. 5, 2012

(30) Foreign Application Priority Data

Sep. 30, 2010   (JP) ................................ 2010-222527

(51) Int. Cl.
*H02H 7/09* (2006.01)
(52) U.S. Cl.
USPC ..................................................... 318/400.22
(58) Field of Classification Search
None
See application file for complete search history.

(56) References Cited

U.S. PATENT DOCUMENTS

| | | | |
|---|---|---|---|
| 5,986,422 A | 11/1999 | Iwashita et al. | |
| 6,809,489 B1 * | 10/2004 | Yoshida et al. | 318/560 |
| 7,462,998 B2 | 12/2008 | Akiyama | |
| 2007/0075670 A1 | 4/2007 | Akiyama | |
| 2010/0220982 A1 * | 9/2010 | Maeda | 388/811 |

FOREIGN PATENT DOCUMENTS

| | | |
|---|---|---|
| JP | 62-060403 A | 3/1987 |
| JP | 09-069013 A | 3/1997 |
| JP | 2003-061377 A | 2/2003 |
| JP | 2003-289685 A | 10/2003 |
| JP | 2006-217746 A | 8/2006 |
| JP | 2007-086904 | 4/2007 |
| JP | 2007-221940 | 8/2007 |

OTHER PUBLICATIONS

Office Action issued in corresponding Japanese Patent Application No. 2010-222527 issued Sep. 4, 2012, with English translation.

\* cited by examiner

*Primary Examiner* — Lincoln Donovan
*Assistant Examiner* — Zoheb Imtiaz
(74) *Attorney, Agent, or Firm* — Banner & Witcoff, Ltd.

(57) ABSTRACT

A motor control device includes: a motor control unit; and a signal output unit, the motor control unit includes: a first control unit configured to estimate a current upper limit value on the basis of the rotation speed of the motor and a current decrease caused by back electromotive force, the first control unit configured to determine a control input corresponding to the estimated current upper limit value, and a second control unit configured to determine a control input to be applied to the motor on the basis of an operation amount of the motor and a target value of the operation amount to control the motor, and in the early period of driving of the motor, the motor is controlled by the first control unit, and in the late period of driving of the motor, the motor is controlled by the second control unit.

6 Claims, 10 Drawing Sheets

CURRENT UPPER LIMIT MODEL DERIVATION $$U_m(\omega) = I_{max} - \frac{I_d}{V_{max}} \omega$$

MOTOR CONTROL DEVICE

CROSS REFERENCE TO RELATED APPLICATION

The present application claims priority from Japanese Patent Application No. 2010-222527, which was filed on Sep. 30, 2010, the disclosure of which is herein incorporated by reference in its entirety.

TECHNICAL FIELD

The present invention relates to a motor control device.

BACKGROUND

As a motor control device which controls a motor such that a driving object is in a target state, a device which controls a motor such that a driving object stops at a target position, and a device which performs acceleration control until a driving object reaches a target speed are known.

As a control technique for conveying a driving object to a target position at high speed and stopping the driving object at the target position, bang-bang control is known (for example, see Patent Document 1). The bang-bang control refers to switching a motor control input (control input) to the maximum or minimum so as to drive a driving object with the maximum capacity of the motor. Thus, it is possible to convey the driving object to a target position at high speed and stopping the driving object at the target position.

In the related art, a motor control device is also known in which, in order to solve the problems regarding a shift between a postulated motor driving current and an actual motor driving current due to a current decrease caused by back electromotive force, and consequently, deterioration in control precision, she maximum limit value of a control duty based on a saturation current which changes depending on a speed is set (for example, see Patent Document 2)

[Patent Document 1] JP-A-2007-086904
[Patent Document 2] JP-A-2007-221940

SUMMARY

In this regard, the bang-bang control is excellent in that a driving object is driven at high speed, but this is a simple control method, and it is not possible to stop the driving object at the target position with high precision. Meanwhile, as a control technique for putting a driving object in a desired state with high precision, a feedback control based on a target profile is known. However, even when a method which sets the limit value of a control input based on the saturation current is used in the feedback control, there is a limit to controlling a driving object at high speed with high precision.

The invention has been finalized in consideration of these problems, and an object of the invention is to provide a motor control device capable of putting a driving object in a desired state at high speed with high precision compared to the related art.

In order to achieve the above-described object, an aspect of the invention provides a motor control device. The motor control device includes motor control unit for controlling a motor, and signal output unit for outputting a predetermined signal each time the motor rotates by a predetermined amount. The motor control device controls the motor on the basis of an output signal of the signal output unit to put an object to be driven by the motor in a target state. In the motor control device according to the aspect of the invention, the motor control unit includes first control unit and second control unit described below.

The first control unit estimates a current upper limit value, which is the upper limit value of a current to be input to the motor, on the basis of the rotation speed of the motor specified from the output signal of the signal output unit taking into consideration a current decrease caused by back electromotive force, and determines a control input corresponding to the estimated current upper limit value as a control input, to be applied to the motor to control the motor. Meanwhile, the second control unit determines a control input to be applied to the motor on the basis of the operation amount specified from the output signal of the signal output unit and the target value of the operation amount to control the motor.

The motor control unit according to the aspect of the invention controls the motor by the first control unit in the early period of driving of the motor, and controls the motor by the second control unit in the late period of driving of the motor, such that the object to be driven by the motor is put in the target state at high speed with high precision.

According to this motor control device, in the early period of driving, the motor is driven with a control input corresponding to a current upper limit value, such that the driving object can be driven with an output corresponding to the maximum output of the motor. Meanwhile, in the late period of driving, a control input is determined on the basis of the operation amount of the motor specified from the output signal of the signal output unit and the target value of the operation amount to control the motor, such that the driving object can he put in the target state with high precision.

Accordingly, according to the aspect of the invention, it is possible to provide a motor control device capable of putting a driving object in a desired state at high speed with high precision. For example, it is possible to provide a motor control device capable of stopping a driving object at a target position or accelerating a driving object to a target speed at high speed with high precision.

According to the aspect of the invention, in a process until the driving object is put in the target state, the control method is switched. For this reason, there is a possibility that control discontinuity undesirably affects the control result depending on a switching form. Thus, it is preferable that the second control unit has the following configuration.

For example, as the second control unit, a configuration is considered in which a control input corresponding to a deviation between the operation amount of the motor specified from the output signal of the signal output unit and the target value of the operation amount is calculated. As a transfer function for calculating a control input from the deviation, for example, a transfer function to the order of one or more including an integral element is used. When a transfer function to the order of one or more is used, it is necessary to provide information of the control input to the second control unit until before the time corresponding to the order.

However, immediately after switching from the first control unit to the second control unit, the second control unit has no information of the corresponding control input. At this time, if control after switching is performed allowing that the control input is zero, only a small control input is obtained because the deviation is small, and discontinuity of the control input occurs before and after switching.

In the second control unit, when the control input is calculated using a transfer function to the order of one or more including an integral element, the second control unit may receive the control input determined by the first control unit at each time before the switching time from the first control unit to calculate the control input in accordance with the transfer function.

In order to suppress discontinuous changes in the control input due to switching, when the motor control unit is switched to motor control by the second control unit, the second control unit may set the target value of the control input at each time after the switching time on the basis of the operation amount of the motor at the switching time specified from the output signal of the signal output unit. Specifically, the second control unit may set the target value of the operation amount at the switching time to a value identical to the operation amount at the switching time specified from the output signal of the signal output unit.

When the transfer function to the order of one or more including the integral element is used as a transfer function for calculating the control input from the deviation, if the target value of the operation amount is set such that the deviation at the switching time becomes zero, it is possible to determine a control input identical to or continuous with the control input immediately before switching as the control input after switching, and to avoid the influence of discontinuous changes in the control input for the motor when switching.

When motor control is realized such that the driving object stops at a target stop position, the second control unit may calculate a control input corresponding a deviation between the rotation amount of the motor as the operation amount specified from the output signal of the signal output unit and the target value of the rotation amount to control the motor such that the driving object stops at the target stop position. In this case, the transfer function to the order of one or more including the integral element may be used as a transfer function for calculating the control input from the deviation, the second control unit may set the target value of the rotation amount at the switching time to a value identical to the rotation amount at the switching time specified from the output signal of the signal output unit.

Besides, the second control unit may be configured as a two-degree-of-freedom control system including both feedback control unit and feedforward control unit. Specifically, the second control unit includes target setting unit for, when the motor control unit is switched to motor control by the second control unit, setting the target value of the operation amount at each time after the switching time on the basis of an operation amount of the motor at the switching time specified from the output signal of the signal output unit such that the object is put in the target state, feedback control unit for calculating a feedback control input corresponding to a deviation between the target value of the operation amount set by the target setting unit and the operation amount specified from the output signal of the signal output unit in accordance with a predetermined transfer function, feedforward control unit for calculating a feedforward control input corresponding to the target value of the operation amount of the motor set by the target setting unit in accordance with a predetermined transfer function with the target value as input, and determination unit for determining an addition value of the feedforward control input and the feedback control input as the control input to be applied to the motor.

When the second control unit is configured as above, in order to suppress discontinuous changes in the control input when switching, it is preferable that adjustment unit for adjusting parameters of the transfer function used in calculating the feedforward control input such that the feedforward control input at the switching time becomes a value corresponding to the control input determined by the first control unit immediately before switching is provided in the second control unit.

If the parameters of the transfer function used in calculating the feedforward control input are adjusted such that the feedforward control input at the switching time becomes a value corresponding to the control input immediately before switching, it is possible to set the feedforward control input to a value identical to or approximated to the control input immediately before switching.

The feedback control unit calculates the feedback control input corresponding to the deviation. Even when the transfer function for calculating the feedback control input is a transfer function including an integral element, immediately after switching in which the deviation is zero or has a small value, the previous feedback control input is zero immediately after the control starts. For this reason, the feedback control unit does not output a large value as the feedback control input. The target setting unit sets the target value at the switching time on the basis of the operation mount of the motor at the switching time specified from the output signal of the signal output unit, thereby ensuring that the deviation is zero or has a small value.

Accordingly, if the addition value of the feedback control input and the feedforward control input set in the above-described manner is determined as the control input, to be applied to the motor, it is possible to suppress discontinuous changes in the control input before and after switching, and as a result, to put the driving object in the target state with high precision.

In other words, in the motor control device, it is preferable that the target setting unit is configured to set the target value of the operation amount at the switching time to a value identical to the operation amount at the switching time specified from the output signal of the signal output unit If the target setting unit is configured as above, it is possible to set the feedback control input at the switching time to be zero, thereby further suppressing discontinuous changes in the control input, before and after switching.

When the motor control device is configured such that the driving object stops at the target stop position, specifically, the target setting unit, the feedback control unit, and the feedforward control unit may have the following configuration.

That is, the target setting unit may set the target values of the rotation speed and the rotation amount of the motor as the target value of the operation amount such that the driving object stops at the target stop position. The feedforward control unit may calculate a control input corresponding to the target value of the rotation speed set by the target setting unit as the feedforward control input. The feedback control unit may calculate a feedback control input corresponding to a deviation between the target value of the rotation amount set by the target setting unit and the rotation amount specified from the output signal of the signal output unit in accordance with the transfer function.

In particular, it is preferable that the target setting unit sets the target value of the rotation amount at the switching time to a value identical to the rotation amount at the switching time specified from the output signal of the signal output unit and sets the target value of the rotation speed at the switching time to a value identical to the rotation speed at the switching time specified from the output signal of the signal output unit. If the target values are set in the above-described manner, it is possible to set the feedback control input at the switching time to be zero. It is also possible to easily adjust the parameters on the basis of the target value of the rotation speed at the switching time and the control input immediately before switching such that the feedforward control input at the switching time becomes a value corresponding to the control input determined by the first control unit immediately before switching.

In the first control unit, control similar to bang-bang control may be introduced in the early period of driving. That is, the first control unit may determine a control input corresponding to the upper limit value of a current to be input to the motor as the control input to be applied to the motor to control the motor without taking into consideration a current decrease caused by back electromotive force, and if a predetermined condition is satisfied, may estimate the current upper limit value, which is the upper limit value of a current to be input to the motor, on the basis of the rotation speed of the motor specified from the output signal of the signal output unit taking into consideration a current decrease caused by back electromotive force and determine a control input corresponding to the estimated current upper limit value as a control input to be applied to the motor to control the motor.

In estimating the current upper limit value, it is preferable to estimate the current upper limit value to be low taking into consideration the influence of estimation errors. However, when the current upper limit value is estimated to be low, even when a control input corresponding to the current upper limit value is applied to the motor, the motor cannot be driven with the maximum output. Meanwhile, during a period in which a control input corresponding to the current upper limit value is input without taking into consideration back electromotive force, similarly to bang-bang control, the motor can be driven with the maximum output, making it possible to drive the driving object at higher speed. According to the aspect of the invention, motor control is performed on the basis of the current upper limit value taking into consideration back electromotive force before motor control is switched from the first control unit to the second control unit. Therefore, at the time of switching from the first control unit to the second control unit, it is possible to suppress control from being unstabilized, thereby realizing stable control.

In the motor control device which stops the driving object at the target stop position, it is preferable that the second control unit has the following configuration. That is, it is preferable that, when the motor control unit is switched to motor control by the second control unit, the second control unit sets the target value of the operation amount at each time after the switching time on the basis of the rotation speed of the motor at the switching time specified from the output signal of the signal output unit such that the motor operates constantly at the rotation speed at the switching time, then, the motor is decelerated and stopped, and the driving object stops at a target stop position, and stops the object to be driven by the motor at the target stop position. With this control, since the motor is decelerated after passing through a constant-speed interval, when control is stabilized after switching from the first control unit to the second control unit, the motor can be decelerated and stopped, such that the driving object can be stopped at the target stop position with higher precision.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Hereinafter, examples of the invention will be described with reference to the drawings.

FIRST EXAMPLE

Figure 1:
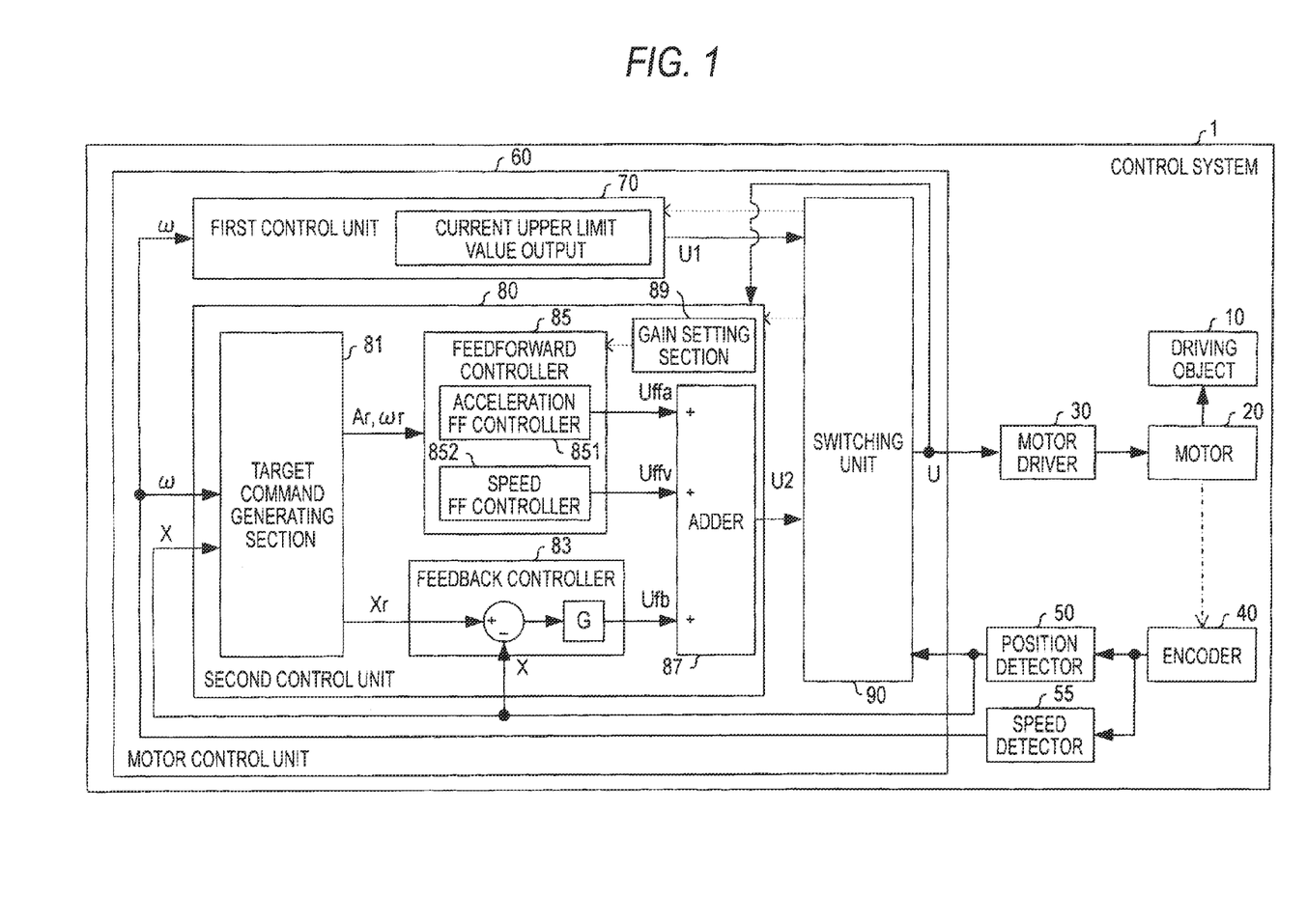
FIG. 1 is a block diagram showing the configuration of a control system 1 of a first example.

As shown in FIG. 1, a control system 1 of this example includes a motor (DC motor) 20 which drives a driving object 10, a motor driver 30, a rotary encoder 40 which is connected to the rotation shaft of the motor 20, a position detector 50 which detects the rotation position X of the motor 20 (in other words, the rotation amount of the motor 20 from the initial position) on the basis of an output signal of the rotary encoder 40, a speed detector 55 which detects the rotation speed $\omega$ of the motor 20, and a motor control unit 60 which calculates a current command value U as a control input for the motor 20.

Figure 2:
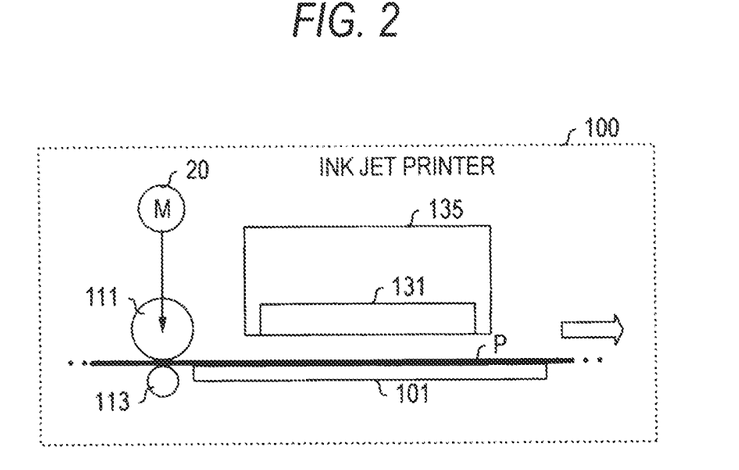
FIG. 2 is a diagram showing the configuration of a sheet conveying mechanism in a printer 100.

The control system 1 is incorporated into an electrical apparatus, such as an image forming apparatus, and performs motor control in accordance with a command input from a main microcomputer or the like of the electrical apparatus. Specifically, a sheet conveying mechanism in an image forming apparatus is an example of the driving object 10. FIG. 2 shows the configuration of a sheet conveying mechanism of an ink jet printer 100 which is postulated as the driving object 10.

The ink jet printer 100 includes a pair of rollers having a conveying roller 111 and a pinch roller 113 on the upstream side of a platen 101, and a sheet P which is conveyed the upstream side is sandwiched between the conveying roller 111 and the pinch roller 113. The sheet P is conveyed to an ink droplet ejection position of ink droplets by a recording head 131 by the rotation of the conveying roller 111. The recording head 131 is located above the platen 101, and ink droplet ejection is performed on the platen 101.

Specifically, if a printing command is received from the outside, the ink jet printer 100 inputs a command to the control system 1 to rotate the motor 20 by a predetermined amount. δx so as to form an image based on image data to be printed designated by the printing command on the sheet p. Thus, the conveying roller 111 is rotated by a predetermined amount. The ink jet printer 100 repeatedly performs this processing to intermittently convey the sheet P by a predetermined amount such that the sheet P is sent to the image forming position by the recording head 131. When sending the sheet P by a predetermined amount, a carriage 135 in which the recording head 131 is mounted is conveyed in the main scanning direction (the direction normal to the paper in FIG. 2) perpendicular to the conveying direction of the sheet p. In the course of conveying, the recording head 131 performs an ink droplet ejection operation on the basis of image data to be printed, and an image based on image data to be printed is formed on the sheet P by a predetermined amount in a stepwise manner.

In this kind of ink jet printer 100, if the sheet P is not conveyed by a predetermined amount with high precision so as to form an image in a stepwise manner by the above-described method, the quality of an image formed on the sheet P is deteriorated. In contrast, according to the control system 1 of this example, for the following reason, it is possible to send the sheet P by a predetermined amount with high precision, making it possible to form an image on the sheet P with satisfactory quality. According to the control system 1 of this example, for the following reason, it is possible to send the sheet P by a predetermined amount at high speed with high precision. For this reason, if the control system 1 of this example is applied to the sheet conveying mechanism of the ink jet printer 100, it is possible to convey the sheet P at high speed while suppressing deterioration in image quality. As a result, it is possible to improve throughput of a sequence of processing relating to image formation.

Subsequently, the detailed configuration of the control system 1 of this example having the above-described advantages will be described. The motor driver 30 in the control system 1 of this example shown in FIG. 1 inputs a driving current corresponding to the current command value U to the motor 20 in accordance with the current command value U input from the motor control unit 60 to drive the motor 20.

The rotary encoder 40 is connected to the rotation shaft of the motor 20, and outputs a pulse signal each time the motor 20 rotates by a predetermined amount. Specifically, the rotary encoder 40 outputs an A-phase signal and a B-phase signal, which are different in phase by π/2, as a pulse signal. The position detector 50 detects the rotation position (the rotation amount from the initial position) of the motor 20 on the basis of the A-phase signal and the B-phase signal output from the rotary encoder 40. Information of the detected rotation position X is input to the motor control unit 60. The speed detector 55 detects the rotation speed ω of the motor 20 on the basis of the A-phase signal and the B-phase signal output from the rotary encoder 40, and inputs corresponding information to the motor control unit 60.

The motor control unit 60 includes a first control unit. 70, a second control unit 80, and a switching unit 90. The switching unit 90 determines one of a current command value U1 calculated by the first control unit 70 and a current command value U2 calculated by the second control unit 80 as the current command value U which is used for motor control, and inputs the determined current command value to the motor driver 30.

A processing operation of the motor control unit 60 will be specifically described. The motor control unit 60 of this example performs control to rotate the motor 20 by a predetermined amount δX and to stop the motor 20 at a position advanced by δX in accordance with a command from the main microcomputer of the electrical apparatus into which the control system 1 is incorporated. In this control process, first, the current command value U1 which is output from the first control unit 70 is input to the motor driver 30, and the motor 20 is driven under the control of the first control unit 70. Thereafter, the current command value U which is input to the motor driver 30 is switched to the current command value U2 which is output from the second control unit 80 on a predetermined condition. With this operation, in the late period of the control process, the motor 20 is driven under the control of the second control unit 80.

The first control unit 70 estimates a current upper limit value Umax to be input, to the motor 20, and outputs the current command value U1 corresponding to the current upper limit value Umax. In the early period of driving of the motor 20, the motor 20 is driven through the first control unit 70 to rotate the motor 20 with maximum ability. However, in this control, it is difficult to stop the motor 20 at a target stop position (the position advanced by δx) accurately. For this reason, in the late period of driving, the motor 20 is driven through the second control unit 80 which is constituted by a two-degree-of-freedom control system including a feedforward controller 85 and a feedback controller 83, and control is performed such that the motor 20 stops at the target stop position (the position advanced by δX) with high precision.

With this control, in the control system 1 of this example, it is possible to rotate the motor 20 by a predetermined amount δX at high speed with high precision.

Specifically, the first control unit 70 in the motor control unit 60 has the following configuration. That is, the first control unit 70 calculates the current upper limit value Umax to be input to the motor 20 as a current amount taking into consideration a current decrease caused by back electromotive force at the rotation speed ω by a predetermined arithmetic expression Um(ω) on the basis of information of the rotation speed ω of the motor 20 input from the speed detector 55, determines the current command value U1 for the motor 20 as the current command value U1=Umax identical to the current upper limit value Umax=Um(ω), and inputs the current command value U1 to the switching unit 90.

The arithmetic expression Um(ω) is theoretically or experimentally defined in advance in the design phase and is set in the first control unit 70. Specifically, in theoretically defining the arithmetic expression Um(ω), a designer can define the arithmetic expression Um(ω) by the following expression on the basis of a rated voltage Vmax of the motor 20, an electromotive force coefficient Ke of the motor 20, and armature resistance Ra.

$$U_m(\omega) = \frac{V_{max} - K_e \cdot \omega}{R_a} \quad \text{[Equation 1]}$$

Figure 3:
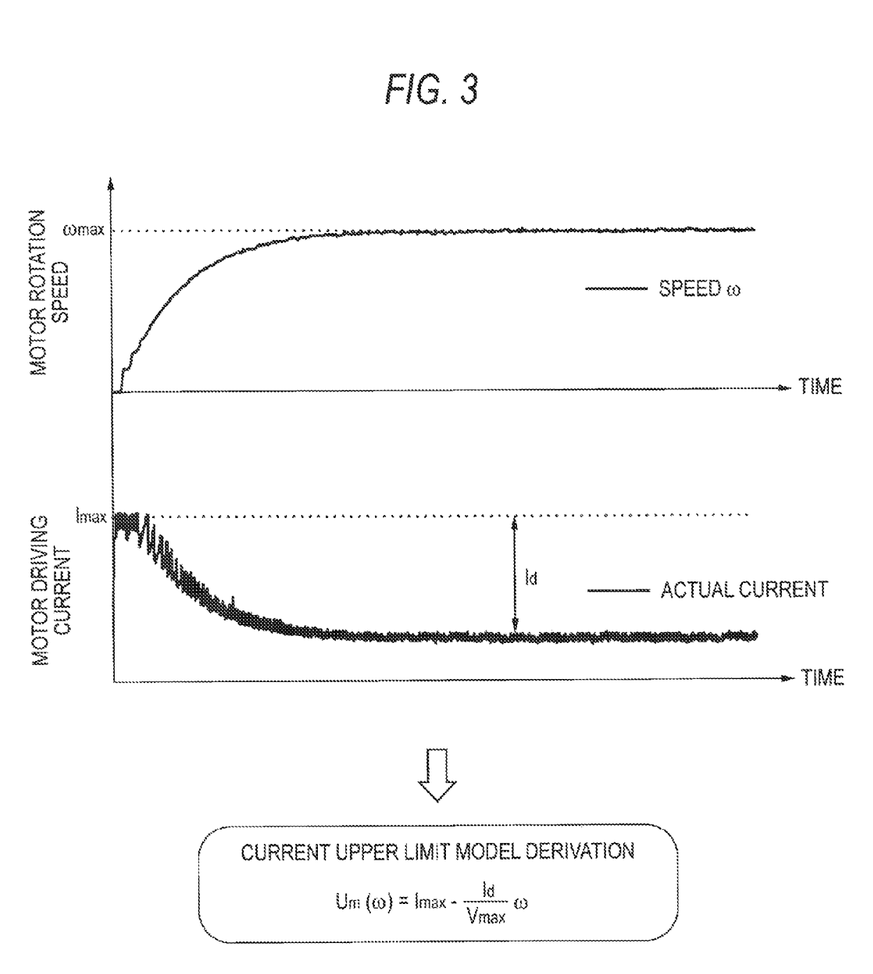
FIG. 3 is an explanatory view of a function $Um(\omega)$ which calculates a current upper limit value Umax.

In defining the arithmetic expression on the basis of an experiment result, as shown in FIG. 3, the arithmetic expression Um(ω) can be defined by the following expression on the basis of the maximum rotation speed ωmax of the motor 20 obtained when the motor 20 is driven with the maximum current amount Imax to be input to the motor 20 in a state where there is no influence of back electromotive force, that is, with the maximum current amount Imax to be input when the rotation speed of the motor 20 is zero and a current decrease amount Id from the maximum current amount Imax of the driving current flowing in the motor 20 at that time $$U_m(\omega) = I_{max} - \frac{I_d}{\omega_{max}} \cdot \omega \quad \text{[Equation 2]}$$

Although the designer freely defines the arithmetic expression Um(ω) theoretically or experimentally, when the arithmetic expression Um(ω) is theoretically obtained, there is a possibility that the current upper limit value Umax is not accurately calculated on the basis of the arithmetic expression Um(ω) due to an influence of an error in a catalog value. Thus, it is preferable to experimentally obtain the arithmetic expression Um(ω).

As described above, the second control unit 80 is constituted by a two-degree-of-freedom control system. The second control unit 80 calculates the current command value U2 for the motor 20 on the basis of the rotation position X of the motor 20 obtained from the position detector 50 and the target position Xr of the rotation position and inputs the current command value U2 to the switching unit 90. Specifically, the second control unit 80 includes a target command generating section 81, a feedback controller 83, a feedforward controller 85, an adder 87, and a gain setting section 89.

When the current command value U output from the switching unit 90 is switched from the current command value U1 to the current command value U2, the target command generating section 81 generates a target profile, which defines a target position locus, a target speed locus, and a target acceleration locus at each time after the switching time, on the basis of information of the rotation position X of the motor 20 detected by the position detector 50 and the rotation speed ω of the motor 20, and inputs a target position Xr, a target speed ωr, and a target acceleration Ar at each time after the switching time to the feedback controller 83 and the feedforward controller 85 in accordance with the target profile.

Figure 4A:
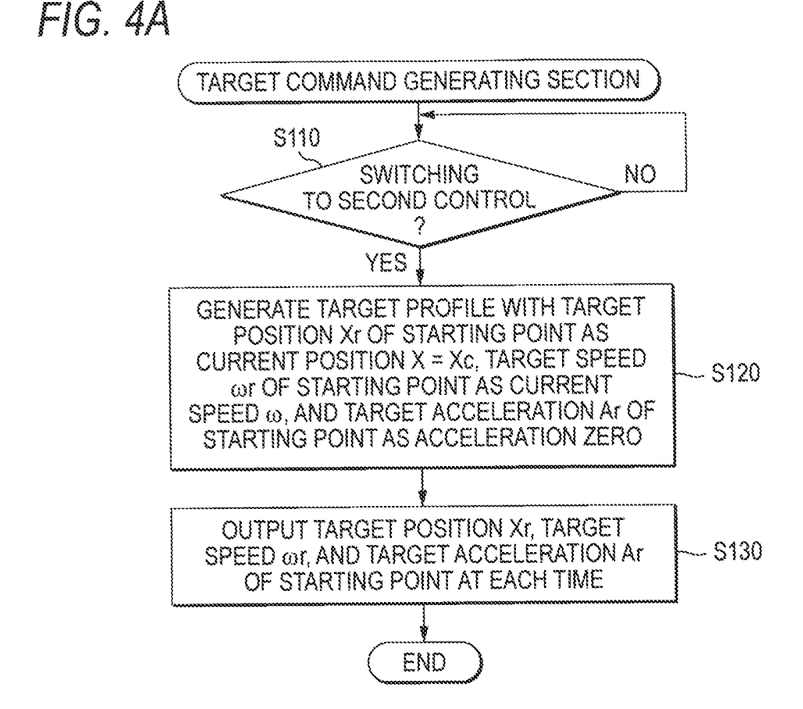
FIG. 4A is a flowchart, showing processing which is performed by a target command generating section 81 of the first example.

Specifically, if a switching notification is input from the switching unit 90 (Yes in S110), as shown in FIG. 4A, the target command generating section 81 defines the target position Xr at the switching time as the rotation position X (a switching position Xc described below) of the motor 20 which is currently detected by the position detector 50, defines the target speed (or at the switching time as the rotation speed ω of the motor 20 which is currently detected by the speed detector 55, and defines the target acceleration Ar at the switching time as zero to generate the target profile (S120). The first stage of FIG. 5 shows the target position Xr at each time after the switching time, and the second stage of FIG. 5 shows the target speed ωr at each time after the switching time.

Specifically, the target command generating section 81 generates the target profile which defines the target position Xr and the target speed ωr at each time such that the motor 20 rotates at constant speed by a predetermined amount α from the switching time, and thereafter, the motor 20 is decelerated with a predetermined rotation amount β and stopped. Of course, the control system 1 of this example is intended to rotate the motor 20 by a predetermined amount δX and to stop the motor 20. Thus, the target profile is generated such that the final position of the target position locus becomes a position Xe advanced by δX from a position X0 when the control process starts. With regard to the target speed locus, a locus is defined such that the target speed (or at the switching time is not changed until the motor 20 rotates by a predetermined amount α from the switching time, and thereafter, the target speed ωr becomes zero when deceleration starts and the motor rotates by a predetermined amount β. In particular, with regard to the target speed locus in the deceleration interval, a locus is defined such that a temporal differentiation at the time of the start and end of deceleration becomes zero and monotonically decreases smoothly. This locus can be defined by, for example, a cosine function with a phase from 0 to π. The target acceleration locus is defined so as to be identical to a temporal differentiation of the target speed locus, and the target position locus is defined so as to be identical to a temporal integration of the target speed locus.

The target command generating section 81 outputs the target position Xr, the target speed ωr, and the target acceleration Ar of each time after the switching time in accordance with the target profile generated by the above-described rule (S130). If the target position Xr, the target speed ωr, and the target acceleration Ar to the ending point are output in accordance with the target profile, the output of the target position Xr, the target speed or, and the target acceleration Ar ends.

Figure 5:
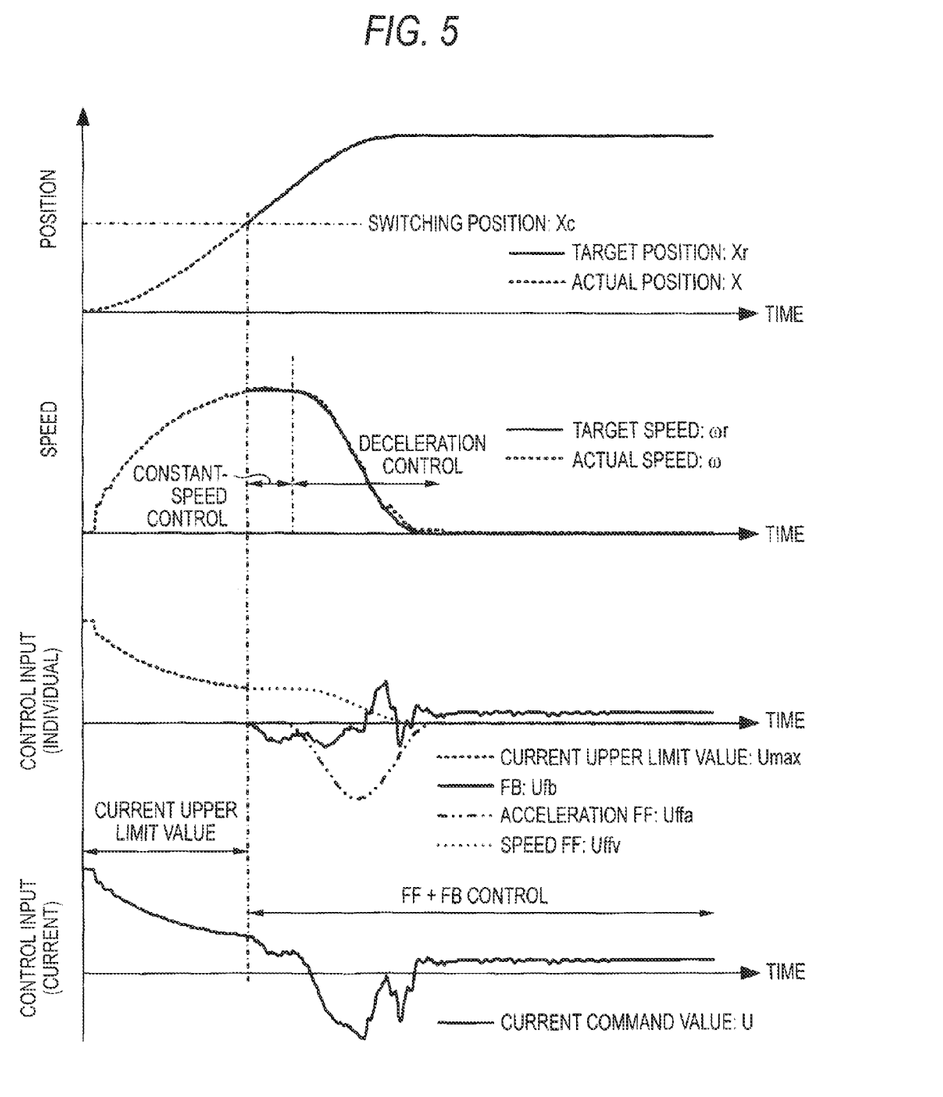
FIG. 5 is a time chart showing a form of motor control in the first example.

The feedback controller 83 inputs a deviation E=Xr−X between the target position Xr input from the target command generating section 81 which generates the target profile configured as above and and the rotation position X of the motor 20 input from the position detector 50 to a predetermined transfer function G defined in advance in the design phase to calculate a feedback control input Ufb (current command value Ufb) corresponding to a deviation E indicated by a solid line in the third stage of FIG. 5 as an example, and inputs the feedback control input Ufb to the adder 87.

Although the feedback controller 83 may calculate the feedback control input Ufb on the basis of the deviation E between the target position Xr input from the target command generating section 81 after the switching time and the rotation position X of the motor 20 input from the position detector 50, for example, by a transfer function including an integral element as the transfer function G, the feedback controller 83 calculates the feedback control input Ufb assuming that the control input until before the time corresponding to an insufficient order at the switching time is zero. That is, although motor control by the motor control unit 60 starts before the switching time, the feedback controller 83 is activated from the switching time and calculates the feedback control input Ufb while regarding the previous control input as zero without using information of the previous control input.

The feedforward controller 85 calculates an acceleration feedforward control input Uffa (current command value Uffa) and a speed feedforward control input Uffv (current command value Uffv) on the basis of the target speed (or and the target acceleration Ar input from the target command generating section 81, and outputs the acceleration feedforward control input Uffa and the speed feedforward control input Uffv to the adder 87.

The feedforward controller 85 includes an acceleration feedforward controller 851 and a speed feedforward controller 852. The acceleration feedforward controller 851 calculates the acceleration feedforward control input Uffa in accordance with the target acceleration Ar input from the target command generating section 81. The speed feedforward controller 852 calculates the speed feedforward control input Uffv in accordance with the target speed ωr input from the target command generating section 81.

Specifically, the acceleration feedforward controller 851 applies a predetermined acceleration gain Kffa to the target acceleration Ar to calculate the acceleration feedforward control input Uffa=Kffa·Ar. Similarly, the speed feedforward controller 352 applies a speed gain Kffv to the target speed (or to calculate the speed feedforward control input Uffv=Kffv·ωr. Incidentally, the acceleration gain Kffa is defined as a fixed value in the design phase, and the speed gain Kffv is adjusted by the gain setting section 89.

The gain setting section 89 adjusts the speed gain Kffv when switching the current command value U output from the switching unit 90 to the current command value U2, such that the current command value U does not significantly change before and after switching, thereby avoiding motor control from being unstabilized because the current command value U significantly changes.

Figure 4B:
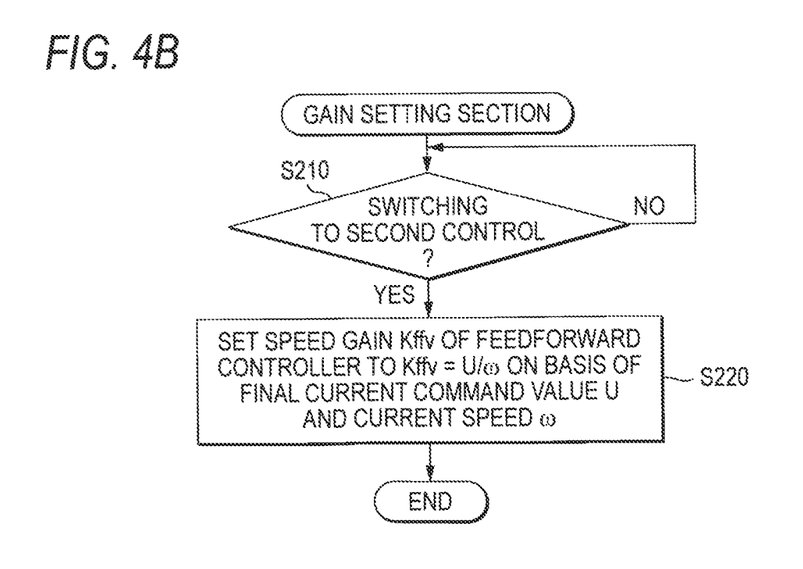
FIG. 4B is a flowchart showing processing which is performed by a gain setting section 89.

Specifically, as shown in FIG. 4B, if a switching notification is input from the switching unit 90 (Yes in S210), the gain setting section 89 adjusts the speed gain Kffv to Kffv=Uc/ωc on the basis of the current command value U=Uc output from the switching unit 90 immediately before switching (in other words, the current command value U1 output from the first control unit 70 immediately before switching) and the speed ω=ωc detected by the speed detector 55 at the switching time (S220).

As described above, in this example, since the target command generating section 81 sets the target speed ωr at the switching time to the speed ω detected by the speed detector 55 at that time, if the speed gain Kffv is adjusted in the above-described manner, the speed feedforward control input Uffv at the switching time is identical to the current command value Uc immediately before switching. In this example, since the target command generating section 81 defines the target acceleration Ar at the switching time as zero, the acceleration feedforward control input Uffa at the switching time is zero. With regard to the feedback control input Ufb at the switching time, since the target command generating section 81 defines the target position Xr at the switching time as the position X detected by the position detector 50 at that time, the deviation E=0, and Ufb=0.

In the second control unit 80, the addition value (Uffa+Uffv+Ufb) of the acceleration feedforward control input Uffa, the speed feedforward control input Uffv, and the feedback control input Ufb calculated by the adder 87 is input to the switching unit 90 as the current command value U2.

For this reason, with the adjustment of the speed gain Kffv, the current command value U after switching becomes U=U2=Uffv=Uc, and the current command value U is identical before and after switching. Thus, in this example, the current command value U before and after switching does not change discontinuously, thereby avoiding control from being unstabilized after switching.

In the third stage of FIG. 5, an example of the speed feedforward control input Uffv is indicated by a dotted line, and an example of the acceleration feedforward control input Uffa is indicated by a two-dot-chain line. The fourth stage of FIG. 5 shows an example of the current command value U output from the switching unit 90 before and after switching. As shown in FIG. 5, according to this example, the current command value U continuously changes before and after switching.

Figure 6:
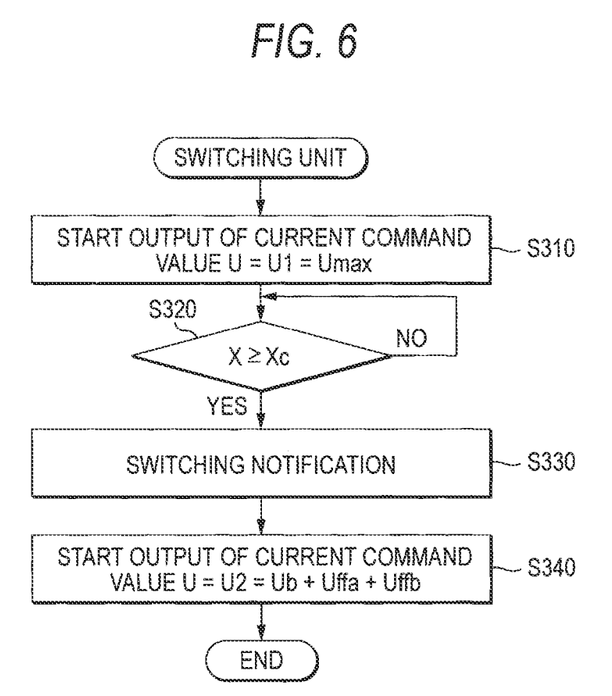
FIG. 6 is a flowchart showing a processing operation of a switching unit 90 of the first example.

A processing operation of the switching unit 90 will be described with reference to FIG. 6. If the control processing which rotates the motor 20 by a predetermined amount δX and stops the motor 20 starts, the switching unit 90 of this example first activates the first control unit 70 and starts processing for outputting the current command value U1 input from the first control unit 70 to the motor driver 30 as the current command value U (S310). Thus, the motor driver 30 drives the motor 20 with a current amount corresponding to the current command value U=U1. In other words, the motor 20 operates to be close to the maximum output.

Thereafter, the switching unit 90 determines whether or not the motor 20 rotates to the switching position Xc advanced by a predetermined amount γ from the point when the current control process starts on the basis of the rotation position X of the motor 20 detected by the position detector 50 (S320). The predetermined amount γ is defined as, for example, a value (δx−α−β) obtained by subtracting a rotation amount β necessary for deceleration and a rotation amount α in the constant-speed interval from the rotation amount δX.

If it is determined that the motor 20 rotates to the switching position Xc (Yes in S320), the above-described switching notification is input to the respective sections of the motor control unit 60 to notify that the current command value U is switched (S330). Thereafter, the second control unit 80 is activated to switch the current command value U output to the motor driver 30 from the current command value U1 input from the first control unit 70 to the current command value U2 input from the second control unit 80. In this way, if the motor 20 rotates to the switching position Xc, thereafter, the switching unit 90 inputs the current command value U2 input from the second control unit 80 to the motor driver 30, such that driving of the motor 20 based on the current command value U2 is realized. Thereafter, the processing shown in FIG. 6 ends.

Although the control system 1 of the first example has been described, according to this example, in the early period of the control process which rotates the motor 20 by a predetermined amount δX and stops the motor 20, the motor 20 is driven with the current upper limit value Umax, such that the motor 20 (and the conveying roller 111) can be driven with an output close to the maximum output of the motor 20. Meanwhile, in the late period of the control process, the motor 20 is controlled by feedback control based on the position X of the motor 20 specified from the output signal of the rotary encoder 40 and the target position Xr, and feedforward control based on the target speed ωr and the target acceleration Ar, such that the motor 20 can stop at a predetermined point with high precision.

Accordingly, if the control system 1 is used to convey a sheet in the ink jet printer 100 or the like, the processing for conveying the conveying roller 111 by a predetermined amount δX can be performed at high speed with high precision, making it possible to suppress deterioration in image quality and to improve throughput of processing relating to image formation.

In particular, according to this example, with the above-described method, since the current command value U output from the switching unit 90 does not change discontinuously at the time of control switching, it is possible to suppress control from being unstabilized due to switching, making it possible to satisfactorily realize driving control of the motor 20 through the first control unit 70 and the second control unit 80.

According to this example, since deceleration control is performed with the constant-speed interval disposed after switching, it is possible to stabilize control in the constant-speed interval after switching, and even when deceleration control is performed immediately, it is possible to stop the motor 20 at a predetermined point with high precision.

In this example, the first control unit 70 corresponds to an example of first control unit of the invention, and the second control unit 80 corresponds to an example of second control unit of the invention. The target command generating section 81 in the second control unit 80 corresponds to an example of target setting unit of the invention, the feedback controller 83 corresponds to an example of feedback control unit of the invention, and the feedforward controller 85 (in particular, the speed feedforward controller 852) corresponds to an example of feedforward control unit of the invention. The adder 87 corresponds to an example of determination unit of the invention, and the gain setting section 89 corresponds to an example of adjustment unit of the invention.

Although in the foregoing example, the feedback control input Ufb becomes zero when switching, this processing is intended to avoid the current command value U from discontinuously changing before and after switching. Thus, if the feedback control input Ufb has a small value when switching, even when the feedback control input Ufb does not become zero, there is no problem. The feedforward controller 85 is not limited to the above-described configuration, the operation to set the speed feedforward control input Uffv to be identical to the current command value Uc immediately before switching can be more broadly conceptualized that the control parameter, such as the speed gain, is adjusted such that the current command value U2 becomes the current command value Uc immediately before switching or a value approximated to the current command value Uc.

In the foregoing example, the configuration in which the current upper limit value Umax is estimated is intended to avoid the occurrence of a control error since the current command value U exceeds the saturation current and a shift occurs between the driving current (current command value U) of the motor 20 postulated in the control system and the actual driving current. However, in order to achieve this object, it is necessary that the current upper limit value Umax is estimated to be low taking into consideration variations between the apparatuses, and the estimated current upper limit value Umax does not exceed the saturation current depending on an individual difference. If the current upper limit value Umax is estimated to be low, the motor 20 cannot be driven with the maximum output, causing deterioration in high-speed performance as that much.

In the control system 1, it is preferable that the first control unit 70 is changed to have the following configuration second example.

SECOND EXAMPLE

Figure 7:
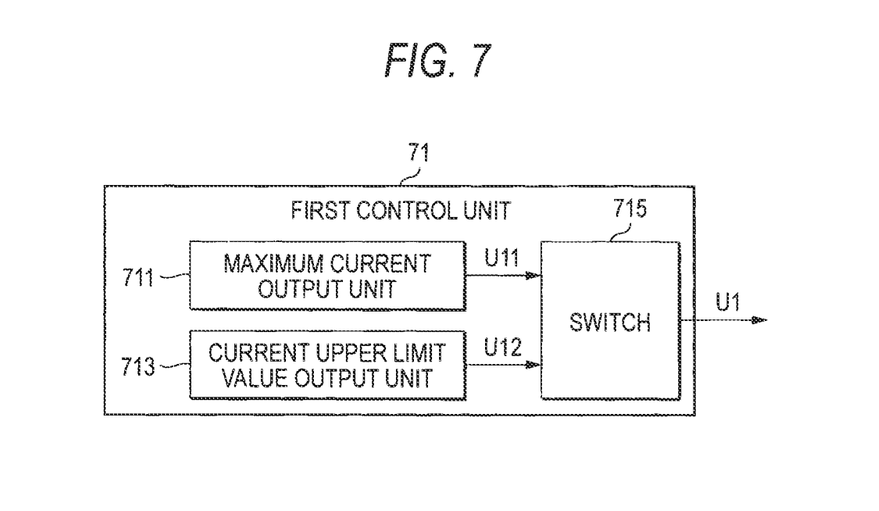
FIG. 7 is a block diagram showing the configuration of a first control unit 71 of a second example.

Subsequently, a second example will be described. A control system of the second example has the same configuration as the control system 1 of the first example, excluding the first control unit 70, and includes a first control unit 71 configured as shown in FIG. 7, instead of the first control unit 70 of the first example.

The first control unit 71 in the control system of the second example includes a maximum current output unit 711, a current upper limit value output unit 713, and a switch 715.

The maximum current output unit 711 outputs the maximum current amount Imax as a current command value U11 when the above-described maximum current amount. Imax, that is, a current decrease caused by back electromotive force is not taken into consideration (the rotation speed of the motor 20 is zero). Similarly to the first control unit 70 of the first example, the current upper limit value output unit 713 calculates the current upper limit value Umax taking into consideration a current decrease caused by back electromotive force in accordance with the rotation speed $\omega$ of the motor 20 detected by the speed detector 55 by the above-described arithmetic expression UM($\omega$), and outputs the current upper limit value Umax=Um($\omega$) as a current command value U12.

The switch 715 selectively inputs one of the current command value U11 input from the maximum current output unit 711 and the current command value U12 input from the current upper limit value output unit 713 to the switching unit 90 as the current command value U1 of the first control unit 71.

Figure 8:
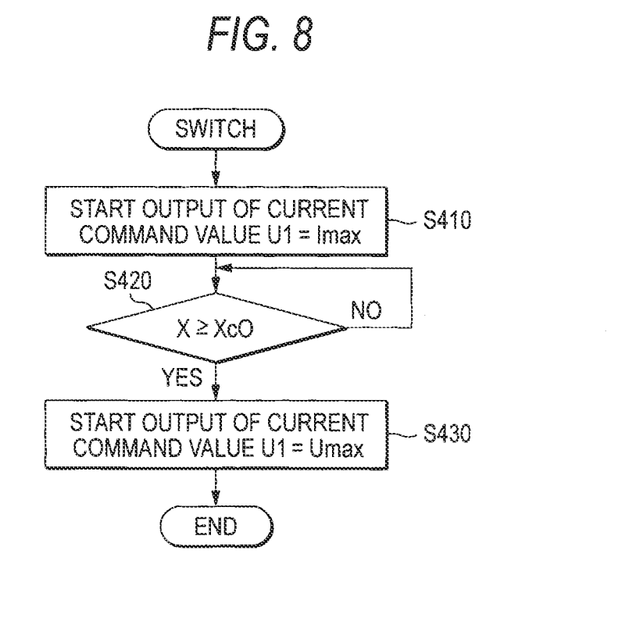
FIG. 8 is a flowchart showing a processing operation of a switch 715 in the first control unit 71.

Specifically, the switch 715 performs processing shown in FIG. 8 to switch and output the current command value U11 and the current command value U12.

That is, in the early period of the control process which rotates the motor 20 by a predetermined amount $\delta X$, the switch 715 first starts an operation to select the current command value U11 input from the maximum current output unit 711 as the current command value U1 to be input, to the switching unit 90 and to output the current command value U11 toward the switching unit 90 (S410). Thereafter, it is determined whether or not the motor 20 rotates to a preceding switching position Xc0 on the basis of the rotation position X of the motor 20 detected by the position detector 50 (S420). The preceding switching position Xc0 is set to a position on the front side by a predetermined amount from the switching position Xc where the switching unit 90 switches the current command value U from the current command value U1 to the current command value U2.

When the motor 20 does not rotate to the preceding switching position Xc0, it waits until the motor 20 rotates to the preceding switching position Xc0 (No in S420) if the motor 20 rotates to the preceding switching position Xc0 (Yes in S420), the switch 715 starts an operation to switch the current command value U1 to be output toward the switching unit. 90, from the current command value U11 input from the maximum current output unit 711 to the current command value U12 input from the current upper limit value output unit 713, and to output the current command value U12 toward the switching unit 90 (S430). Thereafter, the processing shown in FIG. 8 ends.

Figure 9:
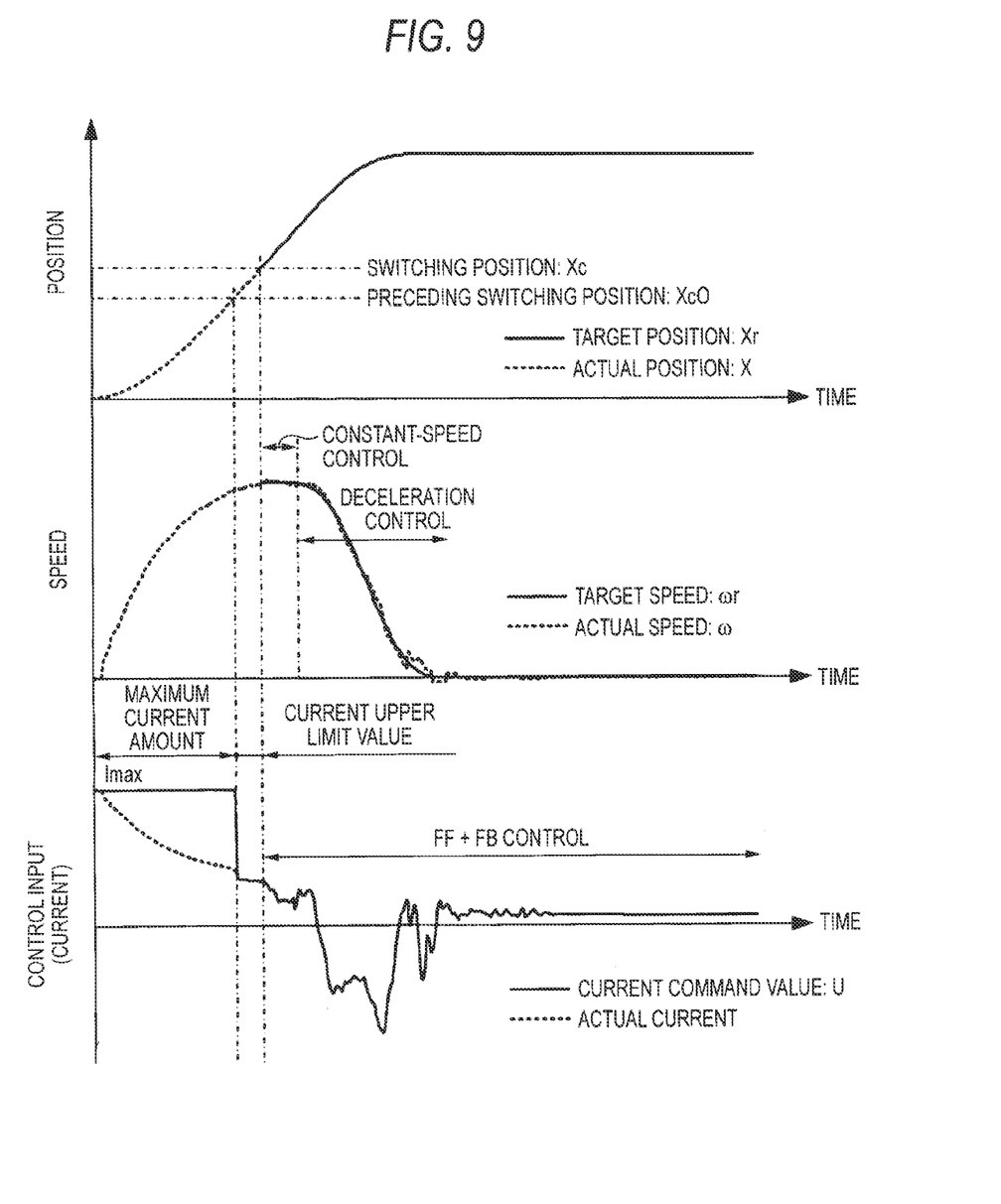
FIG. 9 is a time chart showing a form of motor control in the second example.

The third stage of FIG. 9 shows changes in the current command value U which is output from the switching unit 90 through the processing of the switch 715. In the third stage, the actual driving current of the motor 20 corresponding to the current command value U is indicated by a dotted line. A portion where the dotted line is not viewed indicates that the current command value U is substantially identical to the actual driving current of the motor 20. FIG. 9 shows the locus of the rotation position (actual position) X of the motor 20 and the locus of the target position Xr in the first stage, and the locus of the rotation speed (actual speed) $\omega$ of the motor 20 and the locus of the target speed or in the second stage, in addition to the locus of the current command value U.

As described above, in the second example, the period until the motor 20 rotates to the switching position Xc is divided into two regions, such that the motor 20 is driven with the maximum current amount Imax in the early region, and the motor 20 is driven with the current upper limit value Umax in the late region.

The control system 1 of the second example configured as above has the following advantages. That is, until the rotation position X of the motor 20 reaches the preceding switching position Xc0, the motor 20 can be driven with the maximum output, making it possible to rotate the motor 20 at higher speed than in the first example. Therefore, according to this example, it is possible to perform an operation to convey the sheet P by a predetermined amount at high speed.

However, if the motor 20 is driven with the maximum current amount Imax, the current command value U1 exceeds the saturation current. In this state, if motor control by the second control unit 80 is performed, undesirably, control by the second control unit 80 is performed in a state where the current command value U exceeds the saturation current. Accordingly, in this example, control based on the current upper limit value Umax is performed before control is switched to the second control unit 80, such that the current command value U does not exceed the saturation current, making it possible to perform appropriate control while the current command value U does not exceed the saturation current after the switching position Xc is reached.

Therefore, according to this example, it is possible to rotate the motor 20 by a predetermined amount $\delta X$ at higher speed than in the first example and to stop the motor 20. It is also possible to suppress deterioration in control precision at that time, thereby realizing motor control which is excellent in both precision and high-speed performance.

Although in the first example and the second example, a two-degree-of-freedom control system is used as the second control unit 80, the second control unit 80 may be constituted by only a feedback control system (third example).

THIRD EXAMPLE

Subsequently, a third example will be described. A control system of the third example has the same configuration as the control system of the first example or the second example, except that the configuration of the second control unit is different from the first example or the second example. Hereinafter, thus, the configuration of a second control unit 801 in the motor control unit 60 of the third example will be selectively described with reference to FIGS. 10 and 11.

Figure 10:
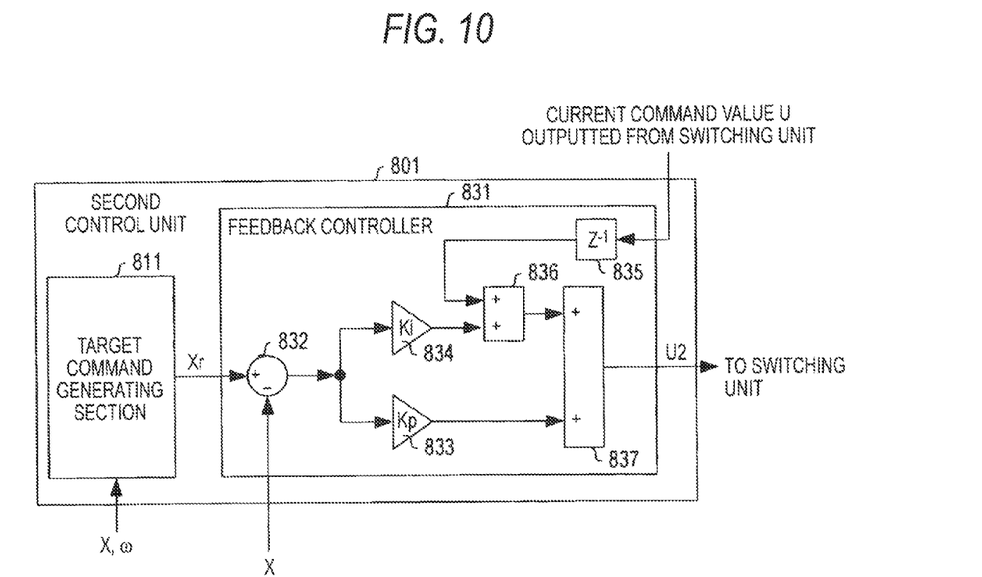
FIG. 10 is a block diagram showing the configuration of a second control unit 801 of a third example.

As shown in FIG. 10, the second control unit 801 in the motor control unit 60 of the third example includes a target command generating section 811 and a feedback controller 831. The target command generating section 811 has the same configuration of the target command generating section 81 of the first example, but since there is no feedforward controller compared to the first example, the target command generating section 811 is different from the target command generating section 81 of the first example in that only the target position Xr is output as a target value.

The feedback controller 831 calculates the current command value U2 corresponding to the deviation E=Xr−X on the basis of information of the target position Xr input from the target command generating section 811 and the rotation position X of the motor 20 input from the position detector 50. Specifically, a controller which calculates the current command value 132 from the deviation E is constituted as a PI controller.

That is, as shown in FIG. 10, the feedback controller 831 includes an adder 832 which calculates the deviation E, an amplifier 833 which amplifies the deviation E with a proportional gain Kp and outputs the amplification result, an amplifier 834 which amplifies the deviation E with an integral gain Ki and outputs the amplification result, a delay unit 835 which stores the current command value U output from the switching unit 90 before one unit time, an adder 836 which adds the current command value U stored in the delay unit 835 and an output Ki·E of the amplifier 834, and outputs the addition result, and an adder 837 which adds an output of the adder 836 and an output Kp~E of the amplifier 833, and outputs the addition value as the current command value U2.

In other words, the feedback controller 831 calculates the current command value U2 from the deviation E in accordance with a transfer function to the order of one including an integral element. When the deviation E is zero, the second control unit 801 outputs the same value as the current command value U output from the switching unit 90 before one unit time as the current command value U2.

That is, if the motor 20 rotates to the switching position Xc, and motor control is switched from motor control by the first control unit 70 to motor control by the second control unit 801, the second control unit 801 outputs the current command value U2 identical to the current command value Uc of the switching unit 90 immediately before switching at the switching time.

Figure 11:
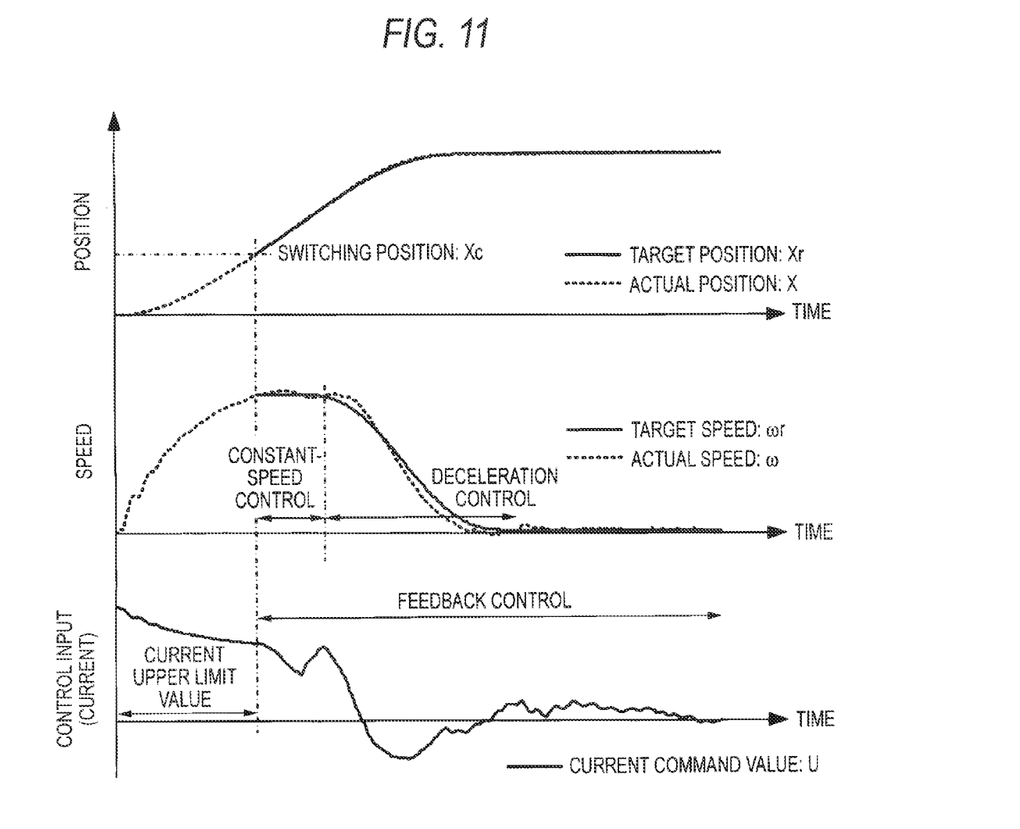
FIG. 11 is a time chart showing a form of motor control in the third example.

The third stage of FIG. 11 shows changes in the current command value U output from the switching unit 90 of this example. In FIG. 11, the locus of the rotation position (actual position) X of the motor 20 and the locus of the target position Xr are shown in the first stage, and the locus of the rotation speed (actual speed) ω of the motor 20 and the locus of the target speed ωr are shown in the second stage.

In the control system 1 in which the second control unit 801 is configured as above, when motor control is switched from motor control by the first control unit 70 to motor control by the second control unit 801, the current command value U output from the switching unit 90 does not become discontinuous, thereby appropriately switching motor control from motor control by the current upper limit value Umax to feedback control. Therefore, according to this example, it is possible to realize the rotation operation of the motor 20 by a predetermined amount δX at high speed with high precision while avoiding control from being =stabilized due to switching. As a result, it is possible to satisfactorily convey a sheet as in the first example and the second example.

Although in the third example, a simple PI controller is used as the feedback controller 831, the feedback controller 831 may be constituted by a different controller so as to calculate the current command value U2 from the deviation E. When a transfer function to the order of one or more is used as the transfer function for calculating the current command value U2 from the deviation E, the second control unit 801 is configured to store the current command value U (the output of the switching unit 90) by the time corresponding to the order, such that, at the time of switching motor control from the first control unit 70 to the second control unit 801, the second control unit 80 receives the current command value U1 calculated by the first control unit 70. If the second control unit 801 is configured as above, it is possible to suppress the occurrence of discontinuous changes in the output (current command value U) of the switching unit 90 due to switching, and as a result, to possible suppress adverse effects due to switching.

Although the examples of the invention have been described, it should be understood that the invention is not limited to the foregoing examples and may be modified in various forms.

For example, the invention can be applied to a control system which accelerates a driving object by the motor 20 to a predetermined speed. For example, in the ink jet printer 100, the carriage 135 is conveyed at constant speed in the main scanning direction so as to eject ink droplets without irregularity. In this case, the speed of the carriage 135 increases from zero to a speed at the time of constant-speed conveying, and the invention can be applied to control at the time of acceleration.

In this case, the switching unit 90 may carry out a switching notification when the speed ω output from the speed detector 55 reaches a predetermined speed, and may switch the current command value U, which is output to the motor driver 30, to the current command value U2 input from the second control unit 80.

Although in the foregoing examples, the control system 1 is configured such that the feedback controller 83 performs position control, and the feedforward controller 85 performs speed control and acceleration control, the control system 1 maybe configured such that the feedback controller 83 and the feedforward controller 85 perform position control.

What is claimed is:
1. A motor control device comprising:
   a motor control unit that is configured to control a motor; and
   a signal output unit that is configured to output a predetermined signal each time the motor rotates by a predetermined amount, wherein:
the motor control device is configured to control the motor on the basis of the output signal of the signal output unit to put an object to be driven by the motor in a target state,
the motor control unit is configured to function as:
a first control unit that is configured to estimate a current upper limit value, which is an upper limit value of a current to be input to the motor, on the basis of the rotation speed of the motor specified from the output signal of the signal output unit and a current decrease caused by back electromotive force, the first control unit configured to determine a control input corresponding to the estimated current upper limit value as a control input to be applied to the motor to control the motor,
a second control unit that is configured to determine a control input to be applied to the motor on the basis of an operation amount of the motor specified from the output signal of the signal output unit and a target value of the operation amount to control the motor, and
in an early period of driving of the motor, the first control unit is configured to control the motor, and in a late period of driving of the motor, the second control unit is configured to control the motor, such that the object is put in the target state, and
the second control unit is configured to function as:
a target setting unit configured to, when the motor control unit is switched to motor control by the second control unit, set the target value of the operation amount at each time after the switching time on the basis of the operation amount of the motor at the switching time specified from the output signal of the signal output unit such that the object is put in the target state,
a feedback control unit configured to calculate a feedback control input corresponding to a deviation between the target value of the operation amount set by the target setting unit and the operation amount specified from the output signal of the signal output unit,
a feedforward control unit configured to calculate a feedforward control input corresponding to the target value of the operation amount of the motor set by the target setting unit in accordance with a predetermined transfer function with the target value as input,
a determination unit configured to determine an addition value of the feedforward control input and the feedback control input as the control input, to be applied to the motor, and
an adjustment unit configured to adjust a parameter of the transfer function used in calculating the feedforward control input such that the feedforward control input at the switching time becomes a value corresponding to the control input determined by the first control unit immediately before switching.

2. The motor control device according to claim 1, wherein the target setting unit is configured to set the target value of the operation amount at the switching time to a value identical to the operation amount at the switching time specified from the output signal of the signal output unit.

3. The motor control device according to claim 1, wherein
the target setting unit is configured to set the target values of a rotation speed and a rotation amount of the motor as the target value of the operation amount such that the object stops at a target stop position,
the feedforward control unit calculates a control input corresponding to the target value of the rotation speed set by the target setting unit as the feedforward control input, and
the feedback control unit calculates a feedback control input corresponding to a deviation between the target value of the rotation amount set by the target setting unit and the rotation amount specified from the output signal of the signal output unit in accordance with the predetermined transfer function.

4. The motor control device according to claim 1, wherein
the second control unit is configured to calculate the control input corresponding to a deviation between the rotation amount of the motor as the operation amount specified from the output signal of the signal output unit and the target value of the rotation amount to control the motor, such that the object stops at a target stop position.

5. The motor control device according to claim 1, wherein
the first control unit is configured to determine a control input corresponding to the upper limit value of the current to be input to the motor as a control input to be applied to the motor to control the motor without taking into consideration a current decrease caused by back electromotive force,
the first control unit is configured to estimate, if a predetermined condition is satisfied, the current upper limit value, which is the upper limit value of the current to be input to the motor, on the basis of the rotation speed of the motor specified from the output signal of the signal output unit and a current decrease caused by back electromotive force, and
the first control unit is configured to determine a control input corresponding to the estimated current upper limit value as a control input to be applied to the motor to control the motor.

6. The motor control device according to claim 1, wherein the second control unit is configured to set, when the motor control unit is switched to motor control by the second control unit, the target value of the operation amount at each time after the switching time on the basis of the rotation speed of the motor at the switching time specified from the output signal of the signal output unit such that the motor operates constantly at the rotation speed at the switching time, then, the motor is decelerated and stopped, and the object stops at a target stop position, and stops the object to be driven by the motor at the target stop position.

* * * * *